(12) United States Patent
Matsuura

(10) Patent No.: US 7,279,890 B2
(45) Date of Patent: Oct. 9, 2007

(54) TANDEM ROTATION DETECTOR FOR HIGH PRECISION DETECTION

(75) Inventor: Mutsumi Matsuura, Tokyo (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/950,853

(22) Filed: Sep. 27, 2004

(65) Prior Publication Data

US 2005/0083043 A1    Apr. 21, 2005

(30) Foreign Application Priority Data

Oct. 17, 2003    (JP)    ............................. 2003-357361

(51) Int. Cl.
*G01B 7/30*    (2006.01)
*G01L 3/00*    (2006.01)

(52) U.S. Cl. .......................... 324/207.25; 324/207.17; 73/862.331

(58) Field of Classification Search ........... 324/207.11, 324/207.15, 207.16, 207.17, 207.24, 207.25, 324/164, 207.18, 207.19; 73/862.331, 862.321, 73/862.193, 862.191, 779, 862.325, 862.326, 73/862.327, 862.328, 862.329, 862.332
See application file for complete search history.

(56) References Cited

U.S. PATENT DOCUMENTS

| | | | |
|---|---|---|---|
| 3,641,467 A | 2/1972 | Ringland et al. | |
| 4,604,575 A | 8/1986 | Shimizu et al. | |
| 4,893,078 A | 1/1990 | Auchterlonie | |
| 5,300,884 A | 4/1994 | Maestre | |
| 2002/0043115 A1* | 4/2002 | Jin et al. | ................ 73/862.331 |
| 2004/0007083 A1* | 1/2004 | Viola et al. | ............ 73/862.335 |

FOREIGN PATENT DOCUMENTS

| | | |
|---|---|---|
| EP | 0 932 018 | 7/1999 |
| JP | 32-013876 | 11/1957 |
| JP | 64-057183 | 3/1989 |
| JP | 2001-272204 | 10/2001 |
| JP | 2003-098019 | 4/2003 |

* cited by examiner

*Primary Examiner*—Edward Lefkowitz
*Assistant Examiner*—David M Schindler
(74) *Attorney, Agent, or Firm*—McDermott Will & Emery LLP

(57) ABSTRACT

A tandem rotation detector is provided for effectively preventing the occurrence of leakage flux between rotation angle detection mechanisms so that high-precision detection can be always realized. The tandem rotation detector of the present invention includes a first rotation angle detection mechanism 2A configured to generate a magnetic flux through a coil 11A of a first outer core 10A provided inside a cylindrical housing 1 for detecting the rotation angle of a rotary shaft 4A arranged in the central portion of the housing 1, and a second rotation angle detection mechanism 2B, placed side by side with the first rotation angle detection mechanism 2A, and configured to generate a magnetic flux through a coil 11B of a second outer core 10B provided inside the housing 1 to detect the rotation angle of a rotary shaft 4B, in which current flows through the coil 11A of the first outer core 10A and the coil 11B of the second outer core 10B in different directions from each other.

6 Claims, 6 Drawing Sheets

TANDEM ROTATION DETECTOR FOR HIGH PRECISION DETECTION

This application claims priority from Japanese Application No. 2003-357361, filed Oct. 17, 2003 (incorporated by reference herein).

BACKGROUND OF THE INVENTION

1. Field of the Invention

The present invention relates to a tandem rotation detector capable of effectively preventing the occurrence of leakage flux between rotation angle detection mechanisms so that high-precision detection can be always realized.

2. Description of the Prior Art

FIG. 1 shows a sectional side view of a conventional tandem rotation detector.

As shown in FIG. 1, this type of tandem rotation detector (for example, Japanese Patent Application Laid-Open No. 2003-098019) is used to detect the rotation angles of rotary shafts. The rotation detector has a rotary shaft 104A and a rotary shaft 104B arranged in series in a central portion of a cylindrical housing 101. A first rotation angle detection mechanism 102A for detecting the rotation angle of the rotary shaft 104A, and a second rotation angle detection mechanism 102B for detecting the rotation angle of the rotary shaft 104B are arranged inside the housing 101. In the first rotation angle detection mechanism 102A, a first outer core 110A and a first stator core 130A are arranged in parallel on the inner surface of the housing 101. A first inner core 120A is mounted on the rotary shaft 104A so as to face the first outer core 110A, and a first rotor core 140A is mounted on the rotary shaft 104A so as to face the first stator core 130A.

A coil 111A is wound on the first outer core 110A with the terminals connected to two outer core pins 112A placed side by side in the horizontal direction, respectively, through which an AC voltage is applied. A coil 121A is wound on the first inner core 120A.

Coils 131A are wound on a plurality of annular stator core teeth 133A provided around the first stator core 130A. The coils 131A have four terminals connected to each other in the X direction (horizontal direction) and the Y direction (vertical direction) respectively, and the four terminals of the coils 131A are connected to four stator core pins 132A which are placed side by side in the horizontal direction, respectively. Coils 141A are wound on a plurality of rotor core teeth 142A provided on the circumference of the rotary shaft 104A.

In such a structure, when an AC voltage is applied to the coil 111A of the first outer core 110A, a voltage corresponding to the rotation angle of the rotary shaft 104A is induced into the first stator core 130A through the first inner core 120A and the first rotor core 140A in the first rotation angle detection mechanism 102A, thereby detecting the rotation angle of the rotary shaft 104A.

Like the first rotation angle detection mechanism 102A, the second rotation angle detection mechanism 102B includes a second outer core 110B, a second inner core 120B, a second stator core 130B, and a second rotor core 140B to detect the rotation angle of the rotary shaft 104B. Then, based on the detected rotation angles of the rotary shafts 104A and 104B, a difference between both rotation angles is detected. Numeral 112B designates outer core pins to which the terminals of coils of the second outer core 110B are connected, while numeral 132B designates four stator core pins to which the respective terminals of coils of the second stator core 130B are connected.

The conventional tandem rotation detector, however, has the following problems.

As mentioned above, the conventional tandem rotation detector can detect both the rotation angles of the rotary shafts 104A and 104B to detect a rotation angle difference between both rotary shafts. In this case, since any amount of magnetic flux 109A leaks out of the first rotation angle detection mechanism 102A toward the second rotation angle detection mechanism 102B as shown by an arrow, it might affect the performance of detection of the rotation angle of the rotary shaft 104B. Likewise, since the magnetic flux also leaks out of the second rotation angle detection mechanism 102B toward the first rotation angle detection mechanism 102A, it might also affect the performance of detection of the rotation angle of the rotary shaft 104A. To prevent the influence of such a leakage flux, a shielding plate can be provided between the first rotation angle detection mechanism 102A and the second rotation angle detection mechanism 102B, but only the shielding plate is not enough to prevent the influence of the leakage flux. Even in this case, the leakage flux still affects the performance of detecting the rotation angles.

SUMMARY OF THE INVENTION

The present invention has been made in view of the above problems, and it is an object thereof to provide a tandem rotation detector capable of effectively preventing the occurrence of leakage flux between rotation angle detection mechanisms so that high-precision detection can be always realized.

According to the present invention, there is provided a tandem rotation detector. The tandem rotation detector includes a first rotation detection mechanism configured to generate a magnetic flux through a coil of a first outer core provided inside a cylindrical housing for detecting the rotation angle of a rotary shaft arranged in the central portion of the housing. It also includes a second rotation angle detection mechanism which is placed side by side with the first rotation angle detection mechanism and configured to generate a magnetic flux through a coil of a second outer core provided inside the housing for detecting the rotation angle of the rotary shaft. In this structure, current flows through the coil of the first outer core and the coil of the second outer core in different directions from each other.

Preferably, one winding terminal of the coil of the first outer core and the other winding terminal of the coil of the second outer core, both of which are different in winding direction, are connected so that an AC voltage will be applied across the terminals.

Alternatively, the coils may be wound around the first and second outer cores in the opposite directions, with the winding start terminals of the coils connected and the winding end terminals of the coils wire-connected, respectively, so that an AC voltage will be applied across the connected terminals.

Further, the rotary shaft may be a single continuous rotary shaft. In this case, the first rotation angle detection mechanism and the second rotation angle detection mechanism detect a rotation angle difference to detect the rotational torque of the rotary shaft.

On the other hand, the rotary shaft may be a set of two rotary shafts. In this case, the first rotation angle detection mechanism and the second rotation angle detection mechanism detect the rotation angles of the two rotary shafts respectively.

The tandem rotation detector of the present invention includes the first rotation angle detection mechanism configured to generate a magnetic flux through the coil of the first outer core provided inside the cylindrical housing for detecting the rotation angle of the rotary shaft arranged in the central portion of the housing, and the second rotation angle detection mechanism which is placed side by side with the first rotation angle detection mechanism and configured to generate a magnetic flux through the coil of the second outer core provided inside the housing for detecting the rotation angle of the rotary shaft. In this structure, since current flows through the coil of the first outer core and the coil of the second outer core in different directions from each other, leakage flux between the rotation angle detection mechanisms can be effectively prevented, and hence high-precision detection can be always realized.

If one winding terminal of the coil of the first outer core and the other winding terminal of the coil of the second outer core, both of which are different in winding direction, are connected so that an AC voltage will be applied across the terminals, leakage flux between the rotation angle detection mechanisms can be prevented effectively in such a simple structure.

On the other hand, if the coils are wound on the first and second outer cores in the opposite directions, with the winding start terminals of the coils connected and the winding end terminals of the coils connected, respectively, so that an AC voltage will be applied across the connected terminals, leakage flux between the rotation angle detection mechanisms can also be prevented effectively in such a simple structure.

Further, if the rotary shaft comprises a single continuous rotary shaft, and the first rotation angle detection mechanism and the second rotation angle detection mechanism detect a rotation angle difference for detecting the rotational torque of the rotary shaft, high-precision detection of the rotational torque can be always realized.

On the other hand, if the rotary shaft is a set of two rotary shafts, and the first rotation angle detection mechanism and the second rotation angle detection mechanism detect the rotation angles of the two rotary shafts respectively, high-precision detection of the rotation angles of the two rotary shafts can be always realized.

DETAILED DESCRIPTION OF THE PREFERRED EMBODIMENTS

Tandem rotation detectors according to embodiments of the present invention will now be described with reference to the accompanying drawings.

Figure 1:
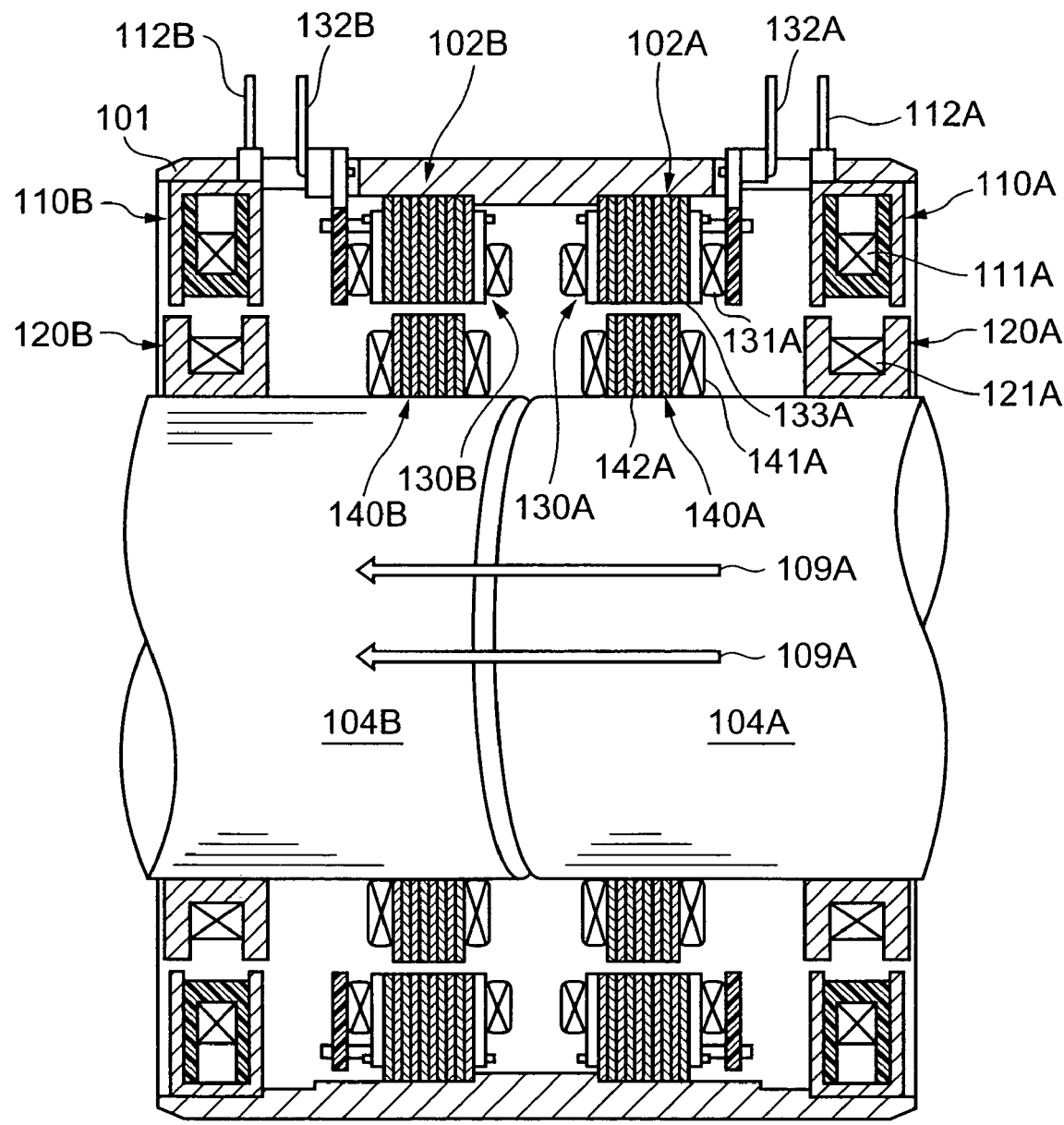
FIG. 1 is a sectional side view of a conventional tandem rotation detector.
Figure 2:
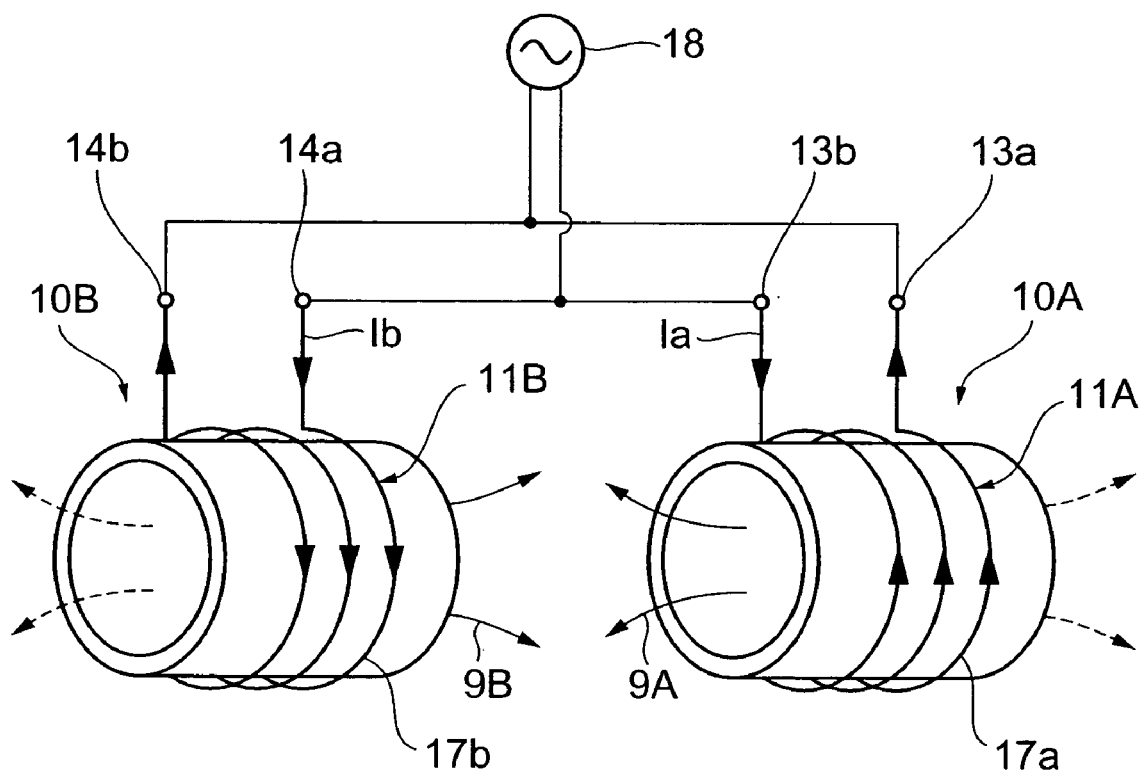
FIG. 2 is a connection diagram of a first outer core and a second outer core in a tandem rotation detector according to an embodiment of the present invention.

FIG. 2 is a connection diagram of a first outer core 10A and a second outer core 10B in a tandem rotation detector according to an embodiment of the present invention.

As shown in FIG. 2, wire 17a is wound around the first outer core 10A clockwise (as seen from the left in FIG. 2) from a winding terminal 13a to a winding 13b to form a coil 11A. Likewise, wire 17b is wound around the second outer core 10B clockwise from a winding terminal 14a to a winding terminal 14b to form a coil 11B. The winding terminal 13a and the winding terminal 14b are connected, and the winding terminal 13b and the winding terminal 14a are connected. In other words, wire connections are made between winding terminals different in winding direction from each other. An AC voltage from an AC oscillator 18 is applied across the winding terminals 13a and 14b and across the winding terminals 13b and 14a, respectively.

When the AC voltage given from the AC oscillator 18 to the winding terminals 13b and 14a is a positive voltage, a current Ia indicated by an arrow flows through the first outer core 10A from the winding terminal 13b toward the winding terminal 13a, while a current Ib (of the same amperage as the current Ia) indicated by an arrow flows through the second outer core 10B from the winding terminal 14a toward the winding terminal 14b. On the other hand, when the AC voltage given from the AC oscillator 18 to the winding terminals 13b and 14a is a negative voltage, a current flows through the first outer core 10A from the winding terminal 13a toward the winding terminal 13b in the direction opposite to the current Ia indicated by an arrow, while a current flows through the second outer core 10B from the winding terminal 14b toward the winding terminal 14a in the direction opposite to the current Ib indicated by an arrow.

When the positive AC voltage is applied to the winding terminals 13b and 14a, a magnetic flux 9A is generated as shown by solid arrows from the first outer core 10A toward the second outer core 10B, while a magnetic flux 9B having the same level as the magnetic flux 9A is generated as shown by an arrows from the second outer core 10B toward the first outer core 10A in the direction opposite to the magnetic flux 9A. On the other hand, when the negative AC voltage is applied to the winding terminals 13b and 14a, magnetic fluxes are generated in the direction opposite to the magnetic fluxes 9A and 9B, as shown by dashed arrows, from the first outer core 10A and the second outer core 10B, respectively.

Thus, since the magnetic flux 9A from the first outer core 10A and the magnetic flux 9B from the second outer core 10B are generated to have the same level but flow in the opposite directions, they balance each other out in the middle between the first outer core 10A and the second outer core 10B.

Figure 3:
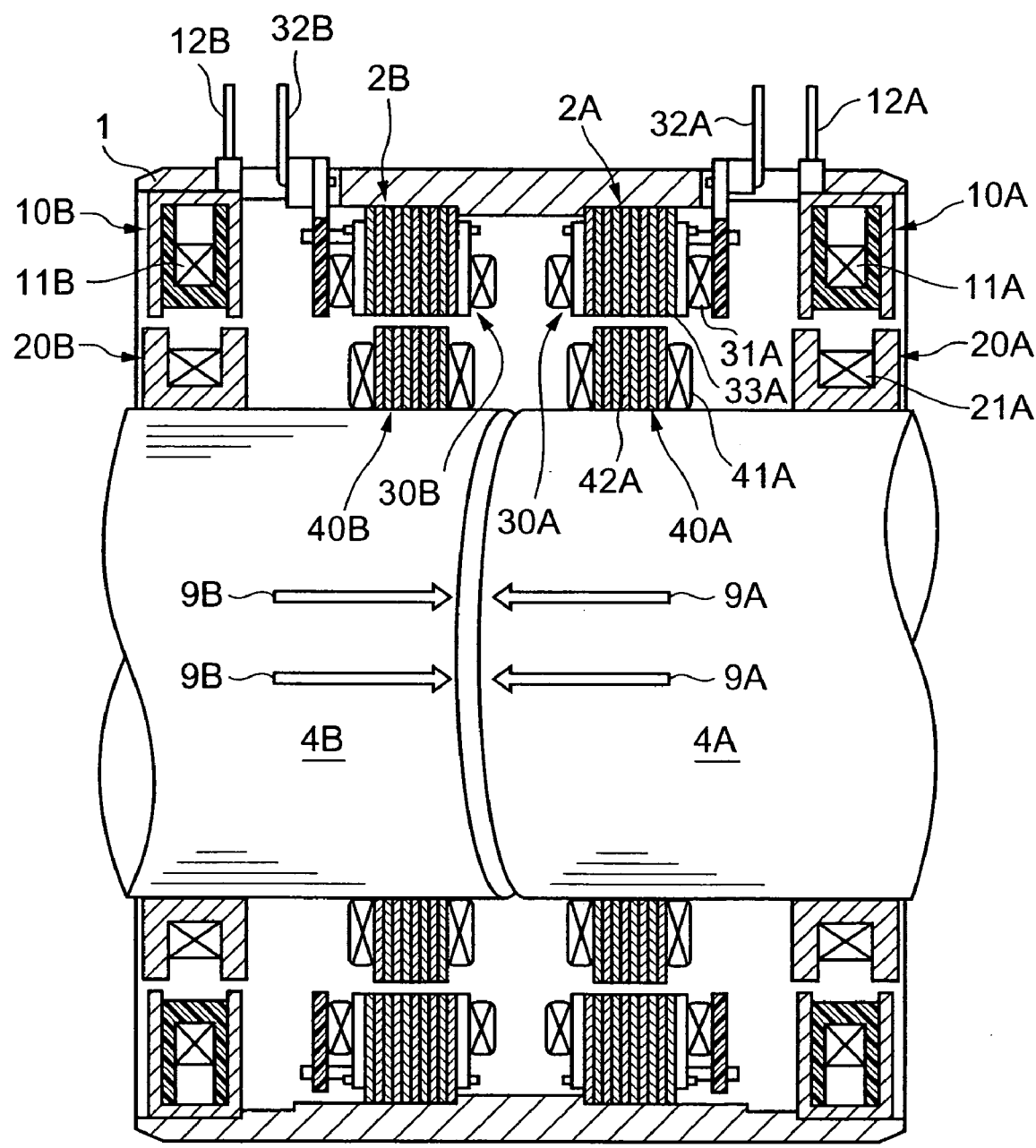
FIG. 3 is a sectional side view of the tandem rotation detector according to the embodiment of the present invention.

FIG. 3 is a sectional side view of the rotation detector according to the embodiment of the present invention.

As shown in FIG. 3, the rotation detector according to the embodiment of the present invention has a rotary shaft 4A and a rotary shaft 4B arranged in series in a cylindrical housing 1. A first rotation angle detection mechanism 2A for detecting the rotation angle of the rotary shaft 4A, and a second rotation angle detection mechanism 2B for detecting the rotation angle of the rotary shaft 4B are provided inside the housing 1. In the first rotation angle detection mechanism 2A, the first outer core 10A and a first stator core 30A are arranged in parallel on the inner surface of the housing 1. A first inner core 20A is mounted on the rotary shaft 4A so as to face the first outer core 10A, and a first rotor core 40A is also mounted on the rotary shaft 4A so as to face the first stator core 30A.

The coil 11A is wound on the first outer core 10A with the terminals connected to two outer core pins 12A which are placed side by side in the horizontal direction, respectively, through which an AC voltage is applied. A coil 21A is wound on the first inner core 20A.

Coils 31A are wound on a plurality of stator core teeth 33A provided around the first stator core 30A. The coils 31A have four terminals connected to each other in the X direction (horizontal direction) and the Y direction (vertical direction) respectively, and the four terminals of the coils 31A are connected to four stator core pins 32A which are placed side by side in the horizontal direction, respectively. Coils 41A are wound on a plurality of rotor core teeth 42A of the first rotor core 40A.

In the first rotation angle detection mechanism 2A, when an AC voltage is applied to the first outer core 10A, a voltage generated by a magnetic flux through the first inner core 20A is applied to the first rotor core 40A so that the first rotor core 40A and the first stator core 30A will be magnetically coupled. As a result, a voltage corresponding to the rotation angle of the rotary shaft 4A is induced onto the first stator core 30A, thereby detecting the rotation angle of the rotation shaft 4A. Like the first rotation angle detection mechanism 2A, the second rotation angle detection mechanism 2B includes the second outer core 10B, a second inner core 20B, a second stator core 30B, and a second rotor core 40B to detect the rotation angle of the rotary shaft 4B. Then, based on the detected rotation angles of the rotary shafts 4A and 4B, a rotation angle difference between both rotary shafts is detected. Here, numeral 12B designates outer core pins to which the terminals of the coil 11B of the second outer core 10B are connected, while numeral 32B designates four stator core pins to which the respective terminals of coils of the second stator core 30B are connected.

The tandem rotation detector according to the embodiment of the present invention detects the rotation angles of the rotary shafts 4A and 4B by applying an AC voltage to the coil 11A of the first outer core 10A and the coil 11B of the second outer core 10B. As mentioned above, since the magnetic flux 9A generated through the first outer core 10A and the magnetic flux 9B generated through the second outer core 10B have the same level but flow in the opposite directions, they balance each other out in the middle between the first outer core 10A and the second outer core 10B (and the magnetic fluxes, respectively generated in the directions opposite to the magnetic fluxes 9A and 9B, also balance each other out). Thus, the penetration of the magnetic flux between the first and second rotation angle detection mechanisms 2A and 2B is mutually blocked, thereby effectively preventing the occurrence of leakage flux.

Figure 4:
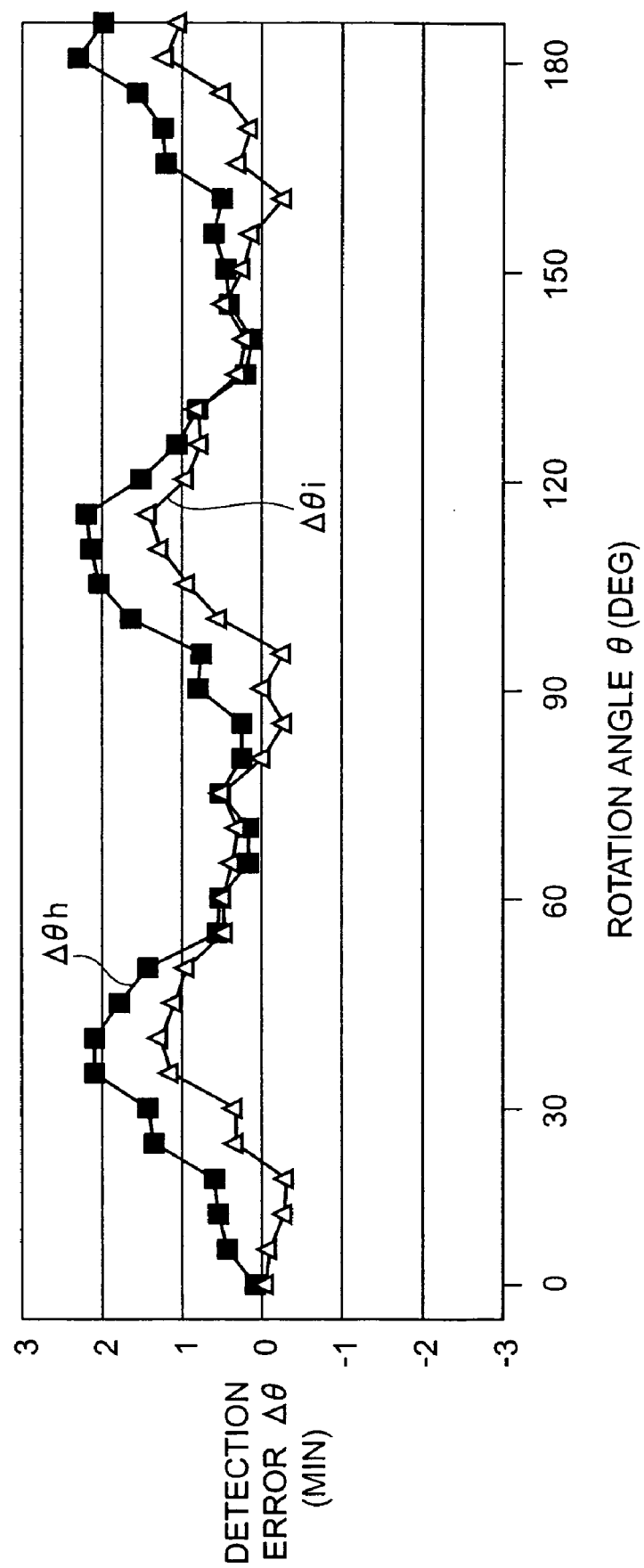
FIG. 4 is a graph showing detection error on the rotation angles of a rotary shaft obtained by a rotation angle detection mechanism.

FIG. 4 is a graph showing detection error on the rotation angles of the rotary shafts for either of the first and second rotation angle detection mechanisms 2A and 2B.

The tandem rotation detector according to the embodiment of the present invention detects the rotation angles of the rotary shafts 4A and 4B through the first and second stator cores 30A and 30B, respectively. The rotation angles are detected electrically. Therefore, when two signals with different two phases are combined, since high-frequency components are mixed into the resultant detection signal, a phase error occurs.

FIG. 4 shows rotation angle $\theta$ (deg) on the abscissa and detection error $\Delta\theta$ (min) caused by phase errors on the ordinate, plotting detection error $\Delta\theta i$ as errors in the rotary shaft 4A detected by the tandem rotation detector according to the embodiment of the present invention, and detection error $\Delta\theta h$ as rotation errors in the conventional tandem rotation detector. In FIG. 4, 1 minute is 1/60 of a degree.

As shown in FIG. 4, the detection error $\Delta\theta i$ on the rotary shaft 4A detected by the tandem rotation detector according to the embodiment of the present invention represents smaller error values as a whole than those detected by the conventional tandem rotation detector, indicating a significant reduction in detection errors. The detection errors relating to the rotary shaft 4B can also be reduced in the same manner, thus enabling high-precision detection.

Figure 5:
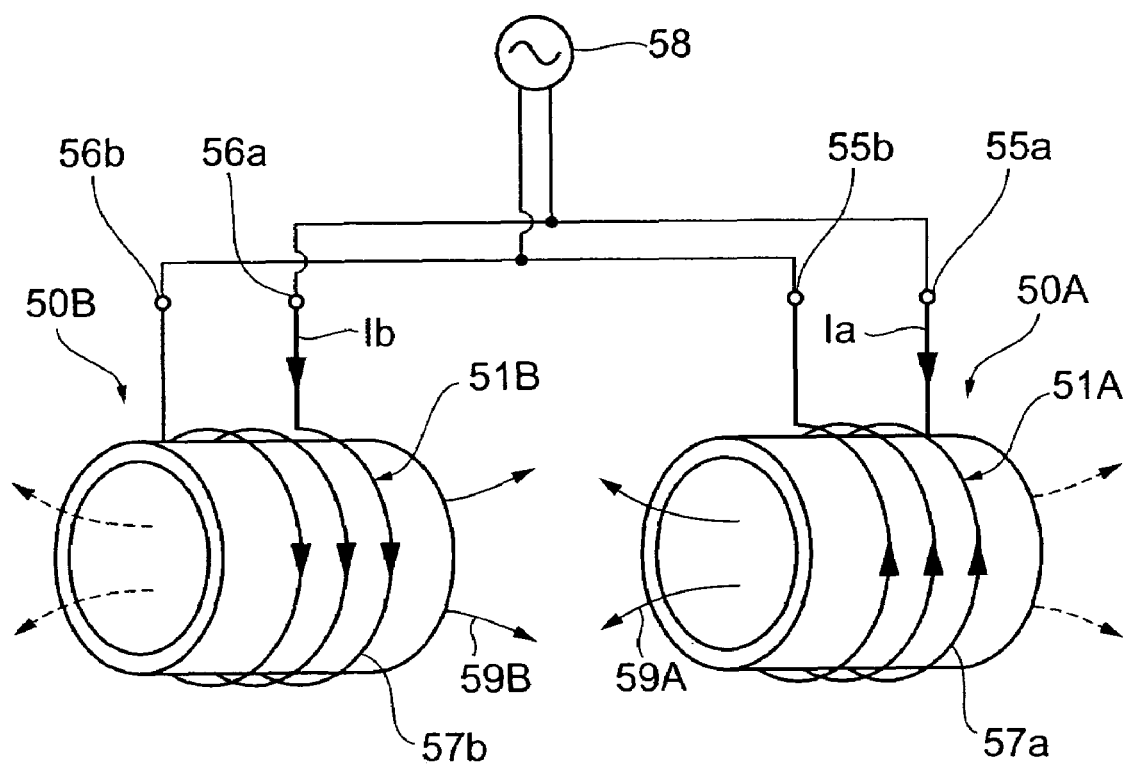
FIG. 5 is a connection diagram of a first outer core and a second outer core in a tandem rotation detector according to another embodiment of the present invention.

FIG. 5 is a connection diagram of a first outer core 50A and a second outer core 50B in a tandem rotation detector according to another embodiment of the present invention.

As shown in FIG. 5, wire 57a is wound around the first outer core 50A counterclockwise (as seen from the left in FIG. 5) from a winding terminal 55a to a winding terminal 55b to form a coil 51A, while wire 57b is wound around the second outer core 50B clockwise from a winding terminal 56a to a winding terminal 56b to form a coil 51B. The winding terminal 55a and the winding terminal 56a are connected, and the winding terminal 55b and the winding terminal 56b are connected. In other words, wire connections are made between winding terminals different in winding direction from each other. An AC voltage from an AC oscillator 58 is applied across the winding terminals 55a and 56a and across the winding terminals 55b and 56b, respectively.

When the AC voltage given from the AC oscillator 58 to the winding terminals 55a and 56a is a positive voltage, the current Ia indicated by the arrow flows through the first outer core 50A from the winding terminal 55a toward the winding terminal 55b, while the current Ib (of the same amperage as the current Ia) indicated by the arrow flows through the second outer core 50B from the winding terminal 56a toward the winding terminal 56b. On the other hand, when the AC voltage given from the AC oscillator 58 to the winding terminals 55a and 56a is a negative voltage, current flows through the first outer core 50A from the winding terminal 55b toward the winding terminal 55a in the direction opposite to the current Ia indicated by the arrow, while current flows through the second outer core 50B from the winding terminal 56b toward the winding terminal 56a in the direction opposite to the current Ib indicated by the arrow.

When the positive AC voltage is applied to the winding terminals 55a and 56a, magnetic flux 59A is generated as shown by solid arrows from the first outer core 50A toward the second outer core 50B, while magnetic flux 59B having the same level as the magnetic flux 59A is generated as shown by solid arrows from the second outer core 50B toward the first outer core 50A in the direction opposite to that of the magnetic flux 59A. On the other hand, when the negative AC voltage is applied to the winding terminals 55a and 56a, magnetic fluxes are generated as shown by dashed arrows in the direction opposite to the magnetic fluxes 59A and 59B from the first outer core 50A and the second outer core 50B, respectively.

Since the magnetic flux 59A generated from the first outer core 50A and the magnetic flux 59B generated from the second outer core 50B have the same level but flow in the opposite directions, they balance each other out in the middle between the first outer core 50A and the second outer core 50B, thus effectively preventing the occurrence of leakage flux.

Figure 6:
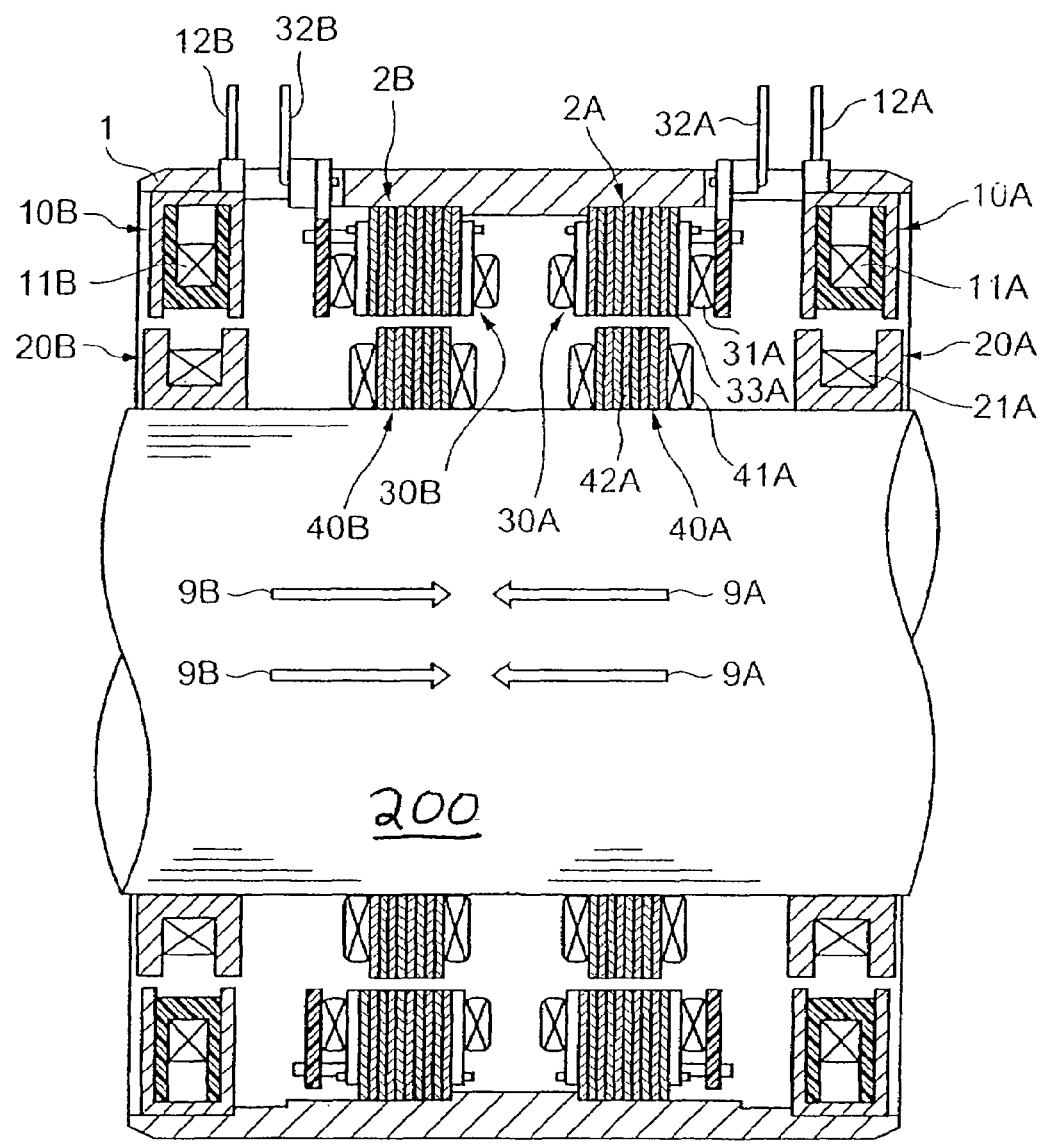
FIG. 6 is a sectional side view of a tandem rotation detector according to the present invention used with a single rotary shaft.

The above embodiments of the present invention illustrate the rotation detectors that detect the rotation angles of the rotary shafts 4A and 4B, but the present invention can also be applied to a detector for detecting a torque of a single rotary shaft 200 with two rotation angle detection mechanisms, as illustrated in FIG. 6.

As described above, the rotation detectors according to the embodiments of the present invention prevent the occurrence of leakage flux so effectively that high-precision detection can be always realized.

What is claimed is:

1. A tandem rotation detector comprising:
   (a) a first rotation angle detection mechanism for detecting a rotation angle of a rotary shaft arranged in a center of a cylindrical housing including:
      (i) a coil of a first outer core provided on the inner surface of the cylindrical housing to generate a magnetic flux,
      (ii) a coil of a first inner core fixed on the rotary shaft confronting the first outer core to receive the magnetic flux generated thereby,
      (iii) a coil of a first rotor core fixed on the rotary shaft, wherein the magnetic flux generated by the first inner core induces a voltage in the first rotor core, and
      (iv) a coil of a first stator core provided on the inner surface of the cylindrical housing to receive a magnetic flux from the coil of the first rotor core; and
   (b) a second rotation angle detection mechanism placed side by side with said first rotation angle detection mechanism for detecting a rotation angle of the rotary shaft, including:
      (i) a coil of a second outer core provided on the inner surface of the cylindrical housing to generate a magnetic flux,
      (ii) a coil of a second inner core fixed on the rotary shaft confronting the second outer core to receive the magnetic flux generated thereby,
      (iii) a coil of a second rotor core fixed on the rotary shaft, wherein the magnetic flux generated by the second inner core induces a voltage in the second rotor core, and
      (iv) a coil of a second stator core provided on the inner surface of the cylindrical housing to receive a magnetic flux from the coil of the second rotor core, wherein the coil of the first stator core and the coil of the second stator core are positioned between the coil of the first outer core and the coil of the second outer core such that leakage magnetic flux generated by the coil of the first outer core is substantially cancelled by leakage magnetic flux generated by the coil of the second outer core.

2. A tandem rotation detector according to claim 1, wherein the coil of the first outer core and the coil of the second outer core each have a winding start terminal and a winding end terminal, and one of the start terminal and the end terminal of the coil of the first outer core and the other of the start terminal and the end terminal of the coil of the second outer core, both of which are different in winding direction, are connected so that an alternating voltage is applied across the terminals.

3. A tandem rotation detector according to claim 1, wherein the coils are wound on the first and second outer cores in opposite directions, and wherein the coil of the first outer core and the coil of the second outer core each have a winding start terminal and a winding end terminal, with the winding start terminals of the coils connected and the winding end terminals of the coils connected, respectively, so that an alternating voltage is applied across the connected terminals.

4. A tandem rotation detector according to claim 1, wherein the rotary shaft comprises a single continuous rotary shaft, and said first rotation angle detection mechanism and said second rotation angle detection mechanism detect a rotation angle difference to detect a rotational torque of the rotary shaft.

5. A tandem rotation detector according to claim 1, wherein the rotary shaft comprises a set of two rotary shafts arranged in series, each of the two rotary shafts having a rotation angle, and said first rotation angle detection mechanism and said second rotation angle detection mechanism detect the rotation angles of the two rotary shafts respectively.

6. A tandem rotation detector according to claim 1, wherein current flows through the coil of the first outer core and the coil of the second outer core in opposite directions to each other.

* * * * *